Nov. 25, 1969  H. J. BALHOUSE  3,479,696
APPARATUS FOR MOLDING LINERS IN HOLLOW METAL BODIES
Filed June 30, 1967  7 Sheets-Sheet 1

INVENTOR.
HAROLD J. BALHOUSE
BY
ATTORNEY

Nov. 25, 1969    H. J. BALHOUSE    3,479,696
APPARATUS FOR MOLDING LINERS IN HOLLOW METAL BODIES
Filed June 30, 1967    7 Sheets-Sheet 2

INVENTOR.
HAROLD J. BALHOUSE
BY David D. McKenney
ATTORNEY

Nov. 25, 1969  H. J. BALHOUSE  3,479,696
APPARATUS FOR MOLDING LINERS IN HOLLOW METAL BODIES
Filed June 30, 1967  7 Sheets-Sheet 3

INVENTOR.
HAROLD J. BALHOUSE
BY
ATTORNEY

INVENTOR.
HAROLD J. BALHOUSE
BY
ATTORNEY

INVENTOR.
HAROLD J. BALHOUSE
ATTORNEY

Nov. 25, 1969   H. J. BALHOUSE   3,479,696
APPARATUS FOR MOLDING LINERS IN HOLLOW METAL BODIES
Filed June 30, 1967   7 Sheets-Sheet 6

INVENTOR.
HAROLD J. BALHOUSE
BY David McKenney
ATTORNEY

Nov. 25, 1969  H. J. BALHOUSE  3,479,696

APPARATUS FOR MOLDING LINERS IN HOLLOW METAL BODIES

Filed June 30, 1967  7 Sheets-Sheet 7

INVENTOR
HAROLD J. BALHOUSE
BY David R. McKenney
ATTORNEY though the axis of the pierced diaphragm opening is at right angles to this path. Furthermore, the injection nozzle is advanced toward and retracted from injection position with respect to the mouth of the plastic inlet by a special drive entirely separate from the main clamping mechanism.

United States Patent Office 3,479,696
Patented Nov. 25, 1969

3,479,696
APPARATUS FOR MOLDING LINERS IN HOLLOW METAL BODIES
Harold J. Balhouse, East Greenwich, R.I., assignor to Grinnell Corporation, Providence, R.I., a corporation of Delaware
Filed June 30, 1967, Ser. No. 650,477
Int. Cl. B29f 5/00; B29c 1/16
U.S. Cl. 18—30                    18 Claims

ABSTRACT OF THE DISCLOSURE

Methods and apparatus for automatically aligning in a molding machine, and for clamping togteher with uniformly distributed clamping force in such a machine, an unlined metal body and mandrels assembled therewith preparatory to and during the actual introduction of the lining material whereby tight seals are achieved between certain surfaces of the assembly members which are forced together and between which lining material might leak during its introduction if there has not been, in addition to the conventional machining of these members, some special machining of the valve body, or if any of such machining has not been done properly.

BACKGROUND OF THE INVENTION

Field of the invention

Metal diaphragm valve bodies are good examples of devices in which linings are often applied to flow passageway surfaces. Hereinafter the descriptions will have to do with the lining of such bodies by the introduction of plastic into the body in a so-called injection molding machine. It will be understood, however, that other items can be lined in accordance with the present invention and other lining materials can be introduced which may not fall under the designation of "plastic" and this introduction may be done in other types of molding machines.

Diaphragm valves are widely used for controlling fluids that must be isolated from the valve actuating mechanisms. The controlled fluids are not contaminated by and cannot wash away the mechanism lubricants. In some cases the corrosive properties of these fluids require that they be prevented from contacting all metal surfaces including those of the body passageway. In such cases solid plastic bodies are sometimes used, but these are relatively expensive and lack the strength characteristic of metal, particularly for the diaphragm valves of large size. Consequently, plastic linings are often applied to metal bodies.

The great majority of these lined metal bodies are initially castings which, prior to the lining operation, have had at least the surfaces around their various openings (diaphragm opening and end openings) machined flat to provide reference surfaces for the mandrels, and to thereby assure the uniform spacing of these mandrels with respect to the passageway walls during the lining operation. This machining also prevents leakage of the plastic lining material from inside the body during the injection operation. It provides tight metal-to-metal contact between certain body and mandrel surfaces.

Description of the prior art

Prior to this invention plastic linings have been applied to machined metal body castings in the following general way: A first metal mandrel member is inserted into the body's diaphragm opening to occupy, in core-fashion, all regions of the flow passage opposite this opening except those which, being immediately adjacent the passage surfaces, are to be filled with liner plastic. The mandrel member has a machined shoulder surface which engages a correspondingly machined body flange surface around the diaphragm opening when the portion has been fully inserted.

Next, second and third metal mandrel members are inserted through the body end openings and along the flow passageways until their inner ends abut the inserted portion of the first member. All the remaining passageway regions, except those to be filled with the liner material, are thus occupied in core-fashion. Special fastening devices at the inner ends of the second and third mandrel members hold them firmly against the inserted portion to form what is, in effect, a single rigid mandrel. Next, apertured fourth and fifth mandrel members are slidably received over the outer ends of the second and third members, fitting closely thereon and against the machined body surfaces around the flow passageway end openings. This completes the closure of the plastic receiving regions. Additional fastening devices between these fourth and fifth members and the extreme body ends draw these members to these ends in the general direction of the flow passageway. This prevents leakage of plastic between the machined end opening surfaces on the body and the last-mentioned members.

However, because of their location at these extreme body ends and because of the direction in which they apply their fastening forces, these additional fastening devices cannot hold the first mandrel member shoulder surface tightly enough against its body flange surface to prevent plastic leakage between these surfaces. Consequently, it has been the practice in the past to obtain the holding force required for a proper seal between these surfaces from the same molding machine clamping action which grips the assembly preparatory to the advance of the injection nozzle into injecting position and during the injection itself.

More particularly, the usual practice has been to introduce the body-mandrel assembly between the clamping heads of a molding machine with the axis of the body's diaphragm opening parallel to the direction of clamping head movement. In this attitude the assembly is temporarily mounted on a supporting fixture secured to one clamping head and opposite a special body-receiving fixture secured to the other clamping head. Moving one of these heads toward the other carries the special fixture against the side of the body opposite the diaphragm opening. This forces the first mandrel member firmly against the supporting fixture and presses the first mandrel member's shoulder surface firmly against the body's diaphragm opening flange surface.

The body surface portions actually engaged by the special fixture have usually been the undersides of the diaphragm opening flange along the sides of the body, but if these surface portions have not been precisely related to (usually parallel to) the machined seal surface around diaphragm opening flange, of if the thickness dimensions of the fixtures themselves and of the first mandrel member have not been exactly uniform around the diaphragm opening axis, such clamping action has produced unequal squeezing along the engaged seal surfaces. This, in turn, results in undesirable flashing of the plastic between these surfaces at those points therealong where the squeezing is least. Accordingly, it has been necessary to control very carefully the machining of all those surfaces which determine these thickness dimensions, including the particular body surfaces engaged by the fixture.

Another reason for the additional machining of the body and for the careful control of all the machining has been to prevent plastic from leaking between the injection nozzle and the mouth of the assembly's plastic inlet. Thus, in the molding machines particularly suited for the present invention the injection nozzle is arranged to reciprocate along a path parallel to the direction of clamping head movement and independently thereof. After the body-mandrel assembly has been firmly gripped by the molding machine heads in the manner above-described the nozzle is advanced until its metal tip is in forcible contact with the metal surface forming the plastic inlet mouth, and this metal-to-metal contact is relied upon to prevent the pressurized plastic from leaking at this location. In the past the plastic inlet has been aligned with the nozzle when the assembly has been initially mounted between the clamping heads, but the clamping itself has often resulted in misalignment of the inlet mouth with respect to the nozzle tip.

SUMMARY OF THE INVENTION

The present invention overcomes the first of these disadvantages by mounting the assembly for a kind of swivelling movement with respect to one of the clamping heads. Even if the body is askew with respect to the direction of clamping head movement, for example, because of varying thickness dimensions caused by casting errors, the force exerted between engaged surfaces of the body and first mandrel member is still distributed reasonably uniformly therealong. With this arrangement it does not matter if the other body surfaces engaged by the special fixture are unmachined. Nor is it necessary to machine the fixture and first mandrel member surfaces as precisely as in the prior art.

In one form of the invention this swivelling is accomplished by providing the first mandrel member and the adjacent clamping machine head with convex and concave spherical surface portions, respectively, fitted together in the nature of a ball joint and by loosely mounting the assembly on one of the clamping heads with the spherical surfaces slightly spaced apart when the clamping heads are in open position. If the combined thickness dimensions of the body, first mandrel member or fixtures should vary around the axis of the diaphragm opening the two spherical surface portions acting on each other during closing of these heads will accommodate any tipping of the assembly caused by this variation and will shift it laterally until the two spherical surface portions are in full contact. The reason for this is that the squeezing force developed between the clamping heads, fixtures, mandrel and body will initially appear on only one side of the diaphragm opening, or at least to a greater extent on one side than elsewhere, and this force shifts and, if necessary, rotates the assembly until the squeeze is generally equalized.

The present invention overcomes the second prior art disadvantage by locating the common center of the fully engaged spherical surface portions in the vicinity of the assembly's plastic inlet. As a result the described shifting of the assembly will not move this inlet out of alignment with the injection nozzle. In one form the surface which surrounds the inlet mouth is a portion of a sphere much smaller than the spheres of the mandrel and fixture surfaces but having its sphere center substantially coincidental with their sphere centers when the body and mandrels are assembled. The nozzle tip surface is a corresponding portion of a sphere of the same smaller size, so that any dimensional variations and errors in the bodies, mandrels and fixtures which result in a shifting of the assembly will have no effect on the continuous sealing engagement between the nozzle tip and inlet surfaces.

Accordingly, it is an object of the present invention to provide a novel method of molding plastic linings into hollow metal bodies by mounting a body and mandrel assembly between the heads of a molding machine in a particular way and by automatically equalizing along a body surface which the mandrel member is intended to sealingly engage, the clamping forces exerted thereon by this mandrel member when the heads are closed.

Another object is to provide a novel method of the kind described in which the larger initial clamping forces on one side of the body surface reorients the assembly with respect to the machine heads to automatically increase the smaller initial clamping forces elsewhere on the body surface.

Another object of the present invention is to provide novel apparatus in which a surface fixed with respect to one clamping head cooperates with a surface on the assembly to form a swivel for the assembly.

Another object is to provide apparatus of the kind described in which the swivel surface fixed with respect to the clamping head is on one fixture secured to a clamping head, in which another fixture, secured to the other clamping head engages another surface of the assembly, and in which the engagement of the swivel surfaces is in the nature of a ball joint.

Another object is to provide apparatus of the kind described in which at least one of the swivel surfaces is a portion of a sphere.

Another object is to provide apparatus of the kind described in which the body surface sealed by the mandrel member is a flat annular surface surrounding a body opening and in which the sphere center of the spherical surface lies on a line which passes through substantially the center of this opening and is perpendicular to the body surface when the assembly is clamped in the machine.

Another object is to provide apparatus of the kind described in which the assembly has a plastic inlet opening located at the sphere center of the spherical surface when the assembly is clamped in the machine, in which this inlet opening is surrounded by an inlet surface, in which the molding machine has an injection nozzle movable between retracted and advanced positions, in which the tip surface of this nozzle engages said inlet surface when said nozzle is in its advanced position, and in which at least one of these last-mentioned surfaces is also a part of a sphere having the same sphere center when the assembly is clamped in the machine and the nozzle is in its advanced position.

Other objects will appear hereinafter.

The best mode in which it has been contemplated applying the principles of the present invention are shown in the accompanying drawings, but these are to be deemed primarily illustrative for it is intended that the patent shall cover by suitable expression in the appended claims whatever of patentable novelty exists in the invention disclosed.

DESCRIPTION OF THE PREFERRED EMBODIMENTS

Referring now more particularly to the drawings, parts 10 and 12 in FIGS. 1 to 4 represent a pair of relatively movable injection molding machine heads. Conventionally one of these heads, for example 12, is stationary and the other, 10, is movable upward from the closed position shown in these FIGS. 1 to 4 to an open or retracted position. This relative movement of the machine heads permits loading of the work into the machine in general alignment with the injection nozzle 13, thereof, gripping of the work during the actual injection of the plastic and releasing of the work when this injection is completed.

Figure 10:
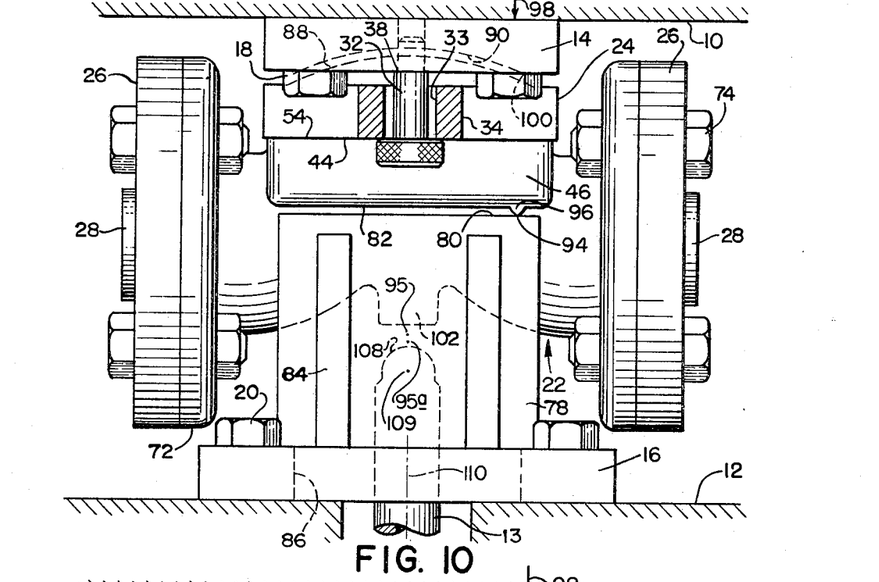
FIGURE 10 is a view like FIG. 1, but showing the assembly loosely mounted on the uppermost fixture and the lowermost fixture spaced slightly away from the body, some of the dimensions being exaggerated for easier understanding, and a casting imperfection being shown on the body flange.

Fixtures 14 and 16, secured to machine heads 10 and 12, respectively, by bolts 18 and 20, serve to receive between them an assembly of metal diaphragm valve body 22 and mandrel members 24, 26, 28 and 30 and to maintain this assembly is proper orientation when the machine heads are closed. Initially these machine heads 10 and 12 are separated far enough for the assembly to be introduced between them and to be loosely hung from the uppermost fixture by hand-turned bolts 32 which pass freely through enlarged openings 33 in mandrel member ears 34 and are threaded into tapped holes 36 in fixture 14. Shoulders 38 prevent the bolts from being turned too far, for example, to the point where the knurled bolt heads 40 would clamp the ears 34 against fixture 14. FIGURE 10 shows the assembly of valve body and mandrel members hung on these bolt heads. The purpose of this loose initial mounting will be understood as the description proceeds.

Figure 1:
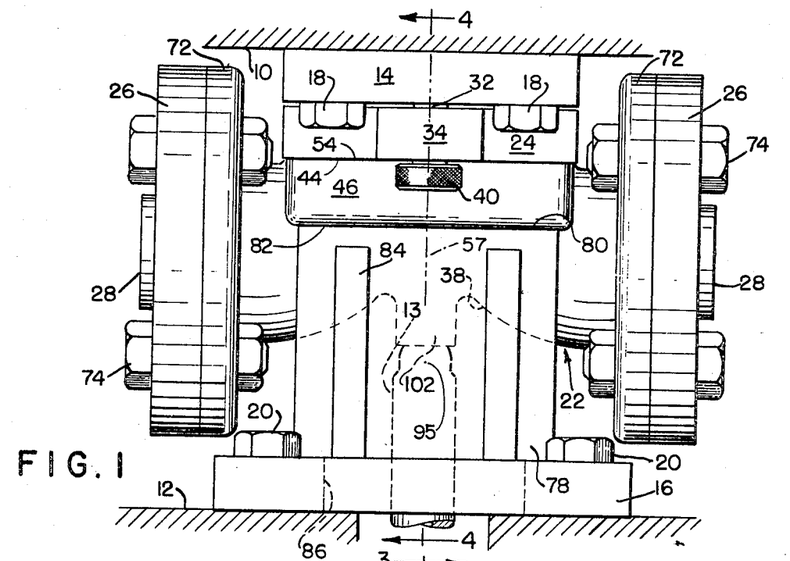
FIGURE 1 is a side elevation view of one apparatus embodiment of the present invention showing mandrel members assembled with a diaphragm valve body and showing this assembly clamped together between fixtures mounted on the heads of an injection molding machine.
Figure 2:
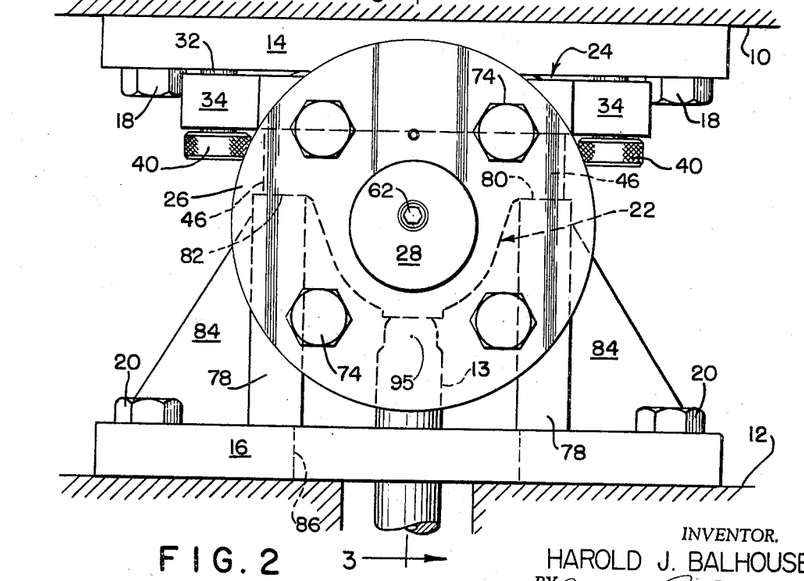
FIGURE 2 is an end elevation view of the apparatus shown in FIG. 1.
Figure 3:
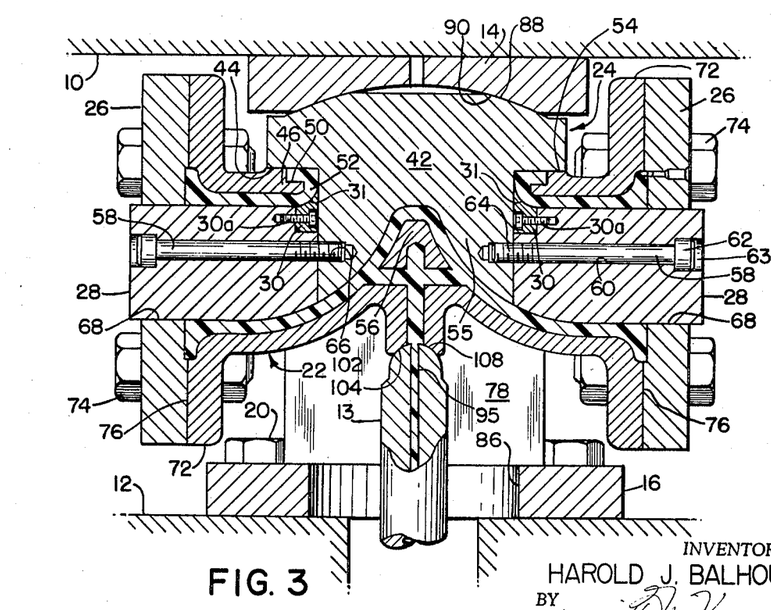
FIGURE 3 is a cross-sectional side elevation view taken on line 3—3 of FIG. 2.
Figure 4:
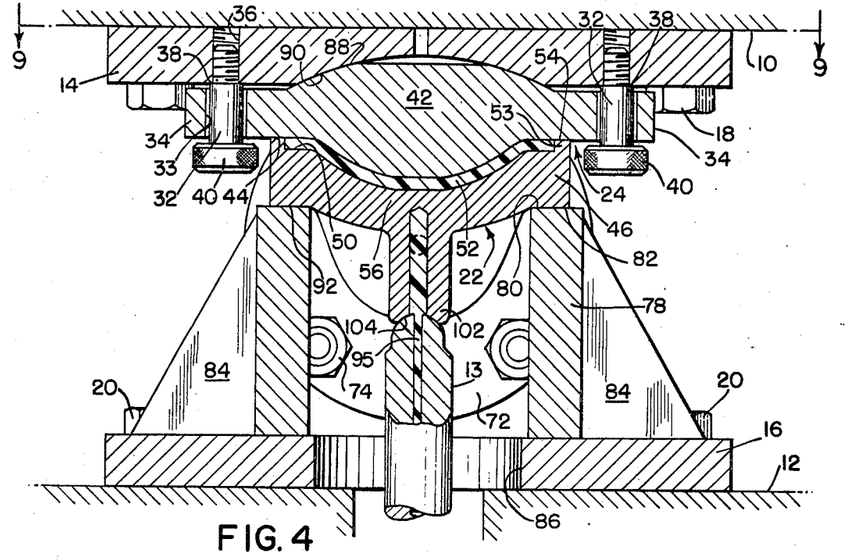
FIGURE 4 is a cross-sectional end elevation view taken on line 4—4 of FIG. 1.
Figure 6:
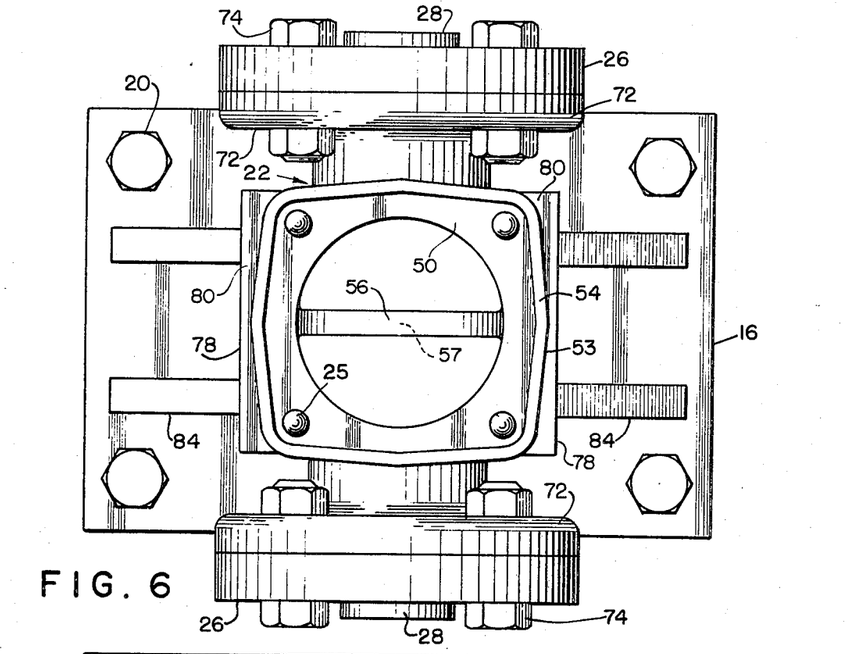
FIGURE 6 is a top plan view like FIG. 5 but showing an unlined valve body mounted on the lowermost fixture and all the mandrel members except one assembled with this body.
Figure 7:
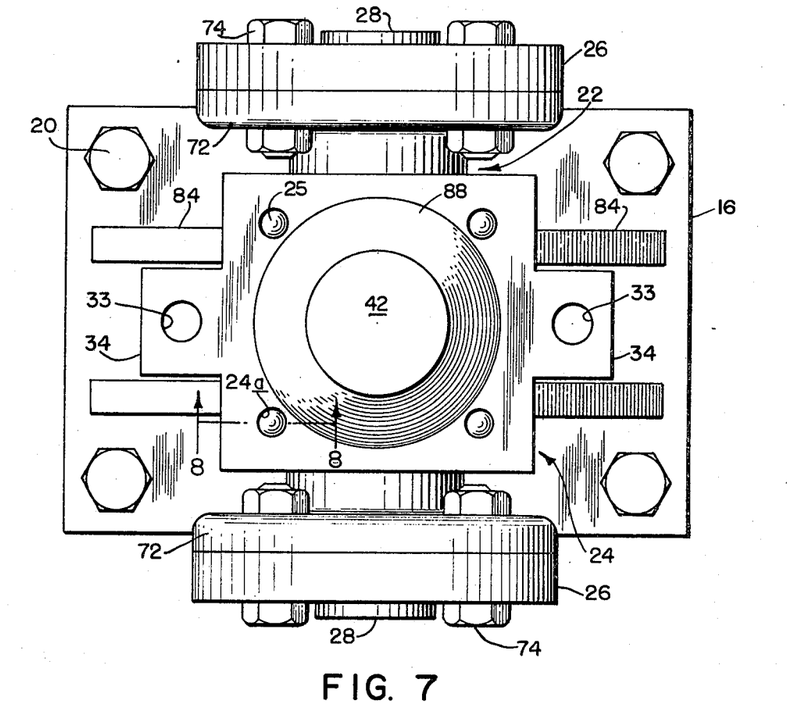
FIGURE 7 is a top plan view like FIG. 6, showing all the mandrel members assembled with the valve body.

The assembly of the mandrel members with the valve body 22 is best shown in FIGS. 3 and 4. The mandrel ears 34 already mentioned protrude from opposite sides of a central mandrel portion 42. This portion has an under surface 44 which lies in a flat plane and which is presented toward the valve body's diaphragm opening flange 46. More specifically, this body flange is recessed at 50 to make room for the plastic liner 52 and to form a lip 53 (FIG. 4) having a surface 54. This is the surface actually engaged by the mandrel member surface 44. The diaphragm opening is generally circular (see FIG. 6) and lies generally in a flat plane which, in the embodiment shown, is parallel to the plane of the surface 54. The diaphragm opening also has an axis 57 perpendicular to its plane so that the surface 54 is presented along this axis. Although liner 52 is shown in FIGS. 3 and 4, the plastic is not injected until after the assembly now being described has been fully clamped between the fixtures in the manner about to be explained.

Figure 8:
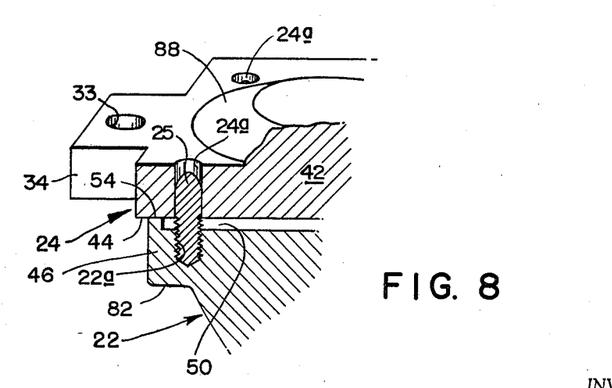
FIGURE 8 is a fragmentary cross-sectional perspective view taken more or less on line 8—8 of FIG. 7 and showing the arrangement for properly registering the mandrel members with respect to the valve body.
Figure 9:
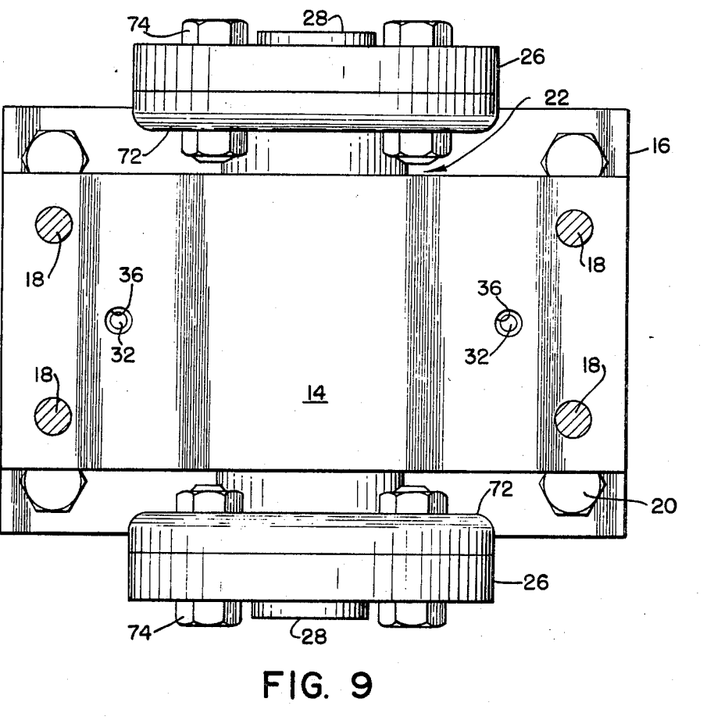
FIGURE 9 is a top plan view like FIG. 7 showing the uppermost fixture in place.

In addition to ears 34 and central portion 42 the mandrel member 24 has a forked cylindrical extension 55 depending from the central portion 42, entering the body diaphragm opening and filling the body flow passage opposite thereto except for the spaces adapted to receive the liner plastic 52. The extension 55 accommodates the valve body weir 56 which forms a partial barrier across the body flow passage and which, when lined, provides a seating surface for the valve diaphragm (not shown). FIG. 8 shows that pins 25, temporarily threaded into tapped body holes 22a, enter mandrel member alignment openings 24a when the body and mandrels are assembled. This alignment and the engagement of surfaces 44 and 54 assure that the plastic lining will have a substantially uniform thickness throughout the body.

Mandrel members 28 are essentially cylindrical metal core pieces which lie in the body flow passages on opposite sides of the weir and which have their inner ends joined to the outer sides of the forked mandrel extension 55 by bolts 58 lying in passages 60 in the members 28. The heads 62 of these bolts engage the bottoms of enlarged recesses 63 at the outer ends of passages 60, and the opposite threaded bolt ends 64 are turned into tapped holes 66 in the forked extension 55. Because of the weir 56 the mandrel members 28 must be introduced into the body flow passages and withdrawn therefrom through the body end openings, and, accordingly, separate insert pieces 30 of a well known design are often joined to members 28. In this case bolts 30a are used to secure these insert pieces which provide radiused curves at 31 on the liner surface and are small enough to be unbolted from members 28 and taken out of the body through the diaphragm opening after the lining operation is completed and after the member 24 has been removed from the body but before members 28 have been removed.

The extending outer end of each mandrel member 28 is received in the central opening 68 of a mandrel plate 26 which covers the outer face of the body flange 72 and is secured thereto by bolt and nut assemblies 74. These assemblies are located in the usual body flange bolt holes and in corresponding bolt holes in the plate.

By this arrangement all the mandrel members are secured together and to the body, but while the tightening of the bolt and nut assemblies 74 prevents any leakage of plastic between the mandrel plates 26 and the outer faces 76 of body flanges 72, it cannot provide an adequate seal between the body flange lip surface 54 and the mandrel surface 44, and, accordingly, the past practice has been to employ the clamping of the assembly between the machine heads to force these surfaces sealingly against each other. However, there has been a difficulty with this past practice, namely the necessity for considerable special machining of each body casting in order to assure sufficient sealing pressure between the surfaces 44 and 54 at all points around the body diaphragm opening.

In lining valve bodies the mandrel members are used over and over again so that careful machining of even most of their surfaces is a relatively small expense factor with respect to each body. Of course, it is preferable to be able to reduce, or to have to be less careful in, this machining of the mandrels. Machining each of the bodies is, however, a much more serious matter. Some such body machining is necessary regardless of the clamping arrangement used, for example, the outer faces 76 and the surface 54, because these are plastic sealing surfaces and because the latter is used as reference to assure that the mandrels will be so located with respect to the body that the plastic liner will be substantially uniform. However, considerable reduction in costs will result if the machining of even one other body surface can be avoided.

The lowermost fixture 16 is provided with upstanding plates 78 having top surfaces 80 which engage the underside 82 of body flange 46. These plates are preferably welded to base 16 and to supporting buttresses 84. Opening 86 in fixture 16 is for the injection nozzle 13.

On the side opposite its forked extension 55 the mandrel member 24 has a convex spherical surface 88 presented toward a corresponding concave spherical surface 90 on the fixture 14. In FIGS. 1 to 4 these spherical surfaces 88 and 90 are in full engagement with each because the clamping machine head 10 has been moved until the body and mandrel are in their final clamped positions. In these positions the sphere centers of the spherical surfaces 88 and 90 are both at point 95.

Figure 11:
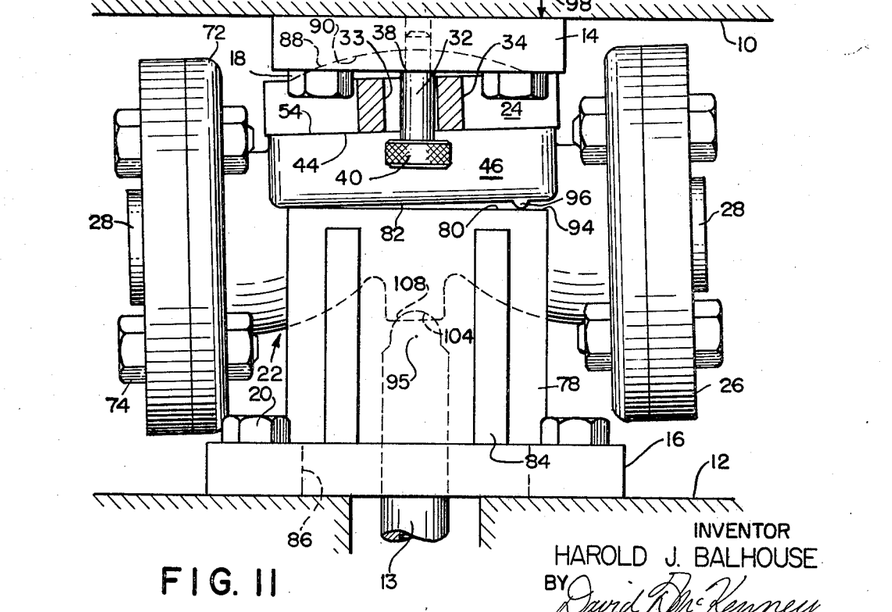
FIGURE 11 is a view like FIG. 10, of the apparatus of FIG. 10, but showing how the complete closing of the clamping heads reorients the assembly about the sphere center of the various spherical surface portions.

FIGURES 10 and 11 illustrate the operation of the apparatus when there is a casting defect 96 on surface 82. In this example the defect is in the form of a protrusion which, if not removed or otherwise taken into account, could cause a substantial leak of the plastic between the surfaces 44 and 54 during the injection. Thus, in the prior art ararngements such a protrusion would have the effect of preventing these surfaces from being squeezed tightly together on the opposite side of the diaphragm opening, or at least on a remote side. In practice a much smaller protrusion than that shown could cause serious plastic leaks without the improvements of the present invention, and it will be understood that those defects which can cause leakage are not limited to such protrusions or to defects on this surface 82. Anything which causes the thickness of the body flange 46 to vary around the diaphragm opening including improper machining of surface 54 will create this problem, and in addition even where there is no defect in the body casting, the mandrel or fixture may have been machined so that their thickness dimensions vary around axis 57. This could cause leakage in the same way as the protrusion 96. Because of the present invention, however, it is not necessary either to treat the body shown in FIGS. 10 and 11 as a reject or to machine away the protrusion. Likewise if the defect were a variation in the thickness dimension of either the fixture or mandrel it would not be necessary to correct it.

In FIG. 10 the assembly of body and mandrel members is shown loosely secured to the uppermost fixture 14 by the hand bolts 32, and the upper machine clamping head 10 has been lowered far enough to bring the plate surface 80 just about into contact with the protrusion 96, but otherwise spaced from the undersurfaces 82. In this FIG. 10 the sphere centers for the spherical surface portions 90 and 88 are indicated at 95 and 95a, respectively, spaced apart because these surfaces are themselves spaced apart.

Further downward movement of the clamping head 10 in the direction of the arrow 98 eventually brings the parts into their final clamped positions of FIG. 11 in which the assembly is tightly clamped between the surfaces 80 of the lowermost fixture and the spherical surface 90 of the uppermost fixture 14. The protrusion 96 results in a tipping of the assembly during this further lowering of the head 10 until the support of the assembly is transferred from the hand bolts 32 to the surfaces 80. Because of the lateral looseness between bolts 32 in their ear openings 33 (this looseness is exaggerated in FIG. 11 to accommodate the large tipping caused by the large protrusion), the misalignment of the spherical surface portions in the initial mounting, or the tipping caused by the weight transfer during final closing of the heads, or both, are likely to cause the two surfaces 88 and 90 to be somewhat out of exact register as they come together. However, their spherical shapes provide for a wedging of the assembly laterally until there is maximum contact between these spherical surfaces 88 and 90. Thus, when two such spherical surfaces, initially slightly out of registration, are brought together they first engage each other only at one point, for example, at 100 (FIG. 10), and the initial clamping force is exerted on the assembly at this location. There is little or no clamping force on the opposite side. However, because the surface 88 is inclined at this point of engagement the assembly is wedged to the left in FIG. 10, and possibly in a direction normal to the plane of the drawing as well, until substantially all parts of the spherical surfaces are brought into engagement. The clamping force is then exerted substantially equally all the way around the diaphragm opening.

This complete mating of the spherical surfaces 88 and 90 brings the plastic inlet 102 on the body into exactly the correct position for receiving the injection nozzle 13, which is in its retracted position in FIG. 10. Such exact registration occurs because the mouth of the inlet 102 is also a spherical surface 104 with the same center 95a as the spherical mandrel surface 88. Surface 104 is one body surface which has always had to be machined to provide a tight seal with the nozzle tip surface 108 when the nozzle is advanced to its injecting position, and it is no more difficult to machine body surface 104 to a generally spherical shape than to some other shape.

The nozzle tip surface 108 is also a part of a sphere having its center at 109 in FIG. 10 and being of the same size as the sphere of the inlet surface 104. When the assembly is fully clamped the sphere center 95 for surface 90 moves into coincidence with center 95a for surfaces 88 and 104. This common center (95, 95a) is on the nozzle axis 110, because the moving sphere center 95 for fixture surface 90 remains on this axis. If the center 95a was ever off this axis the lateral shifting above described brings it back onto this axis. As the clamping head 10 moves down from the position of FIG. 10 the counterclockwise tipping of the assembly caused by the protrusion 96 would swing the sphere center 95a to the right of axis 110. The subsequent complete mating of surfaces 88 and 90 laterally shifts the assembly on surfaces 80 to move the center 95a back toward the axis 110 and finally into coincidence with the downwardly moving center 95.

When the nozzle is advanced to the injecting position its surface sphere center 109 also becomes coincidental with sphere center 95. This is shown in FIG. 11.

Figure 4A:
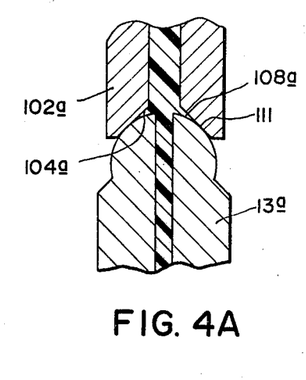
FIGURES 4A and 4B are fragmentary views of other embodiments in which one of the engaging inlet opening and nozzle tip surfaces is spherical and the other is not.
Figure 4B:
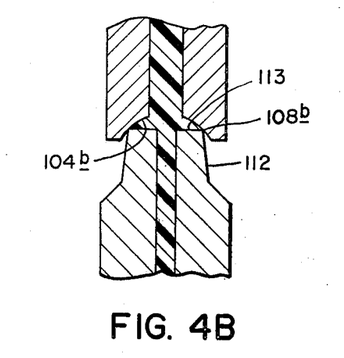
Figure 5:
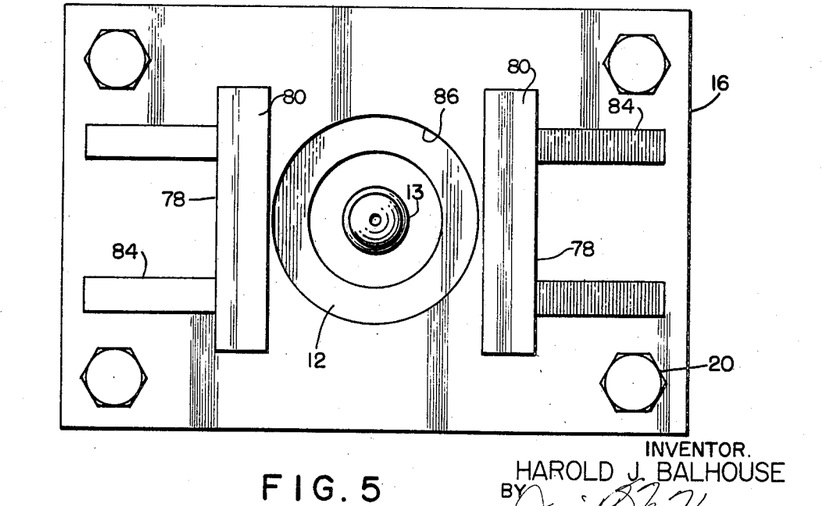
FIGURE 5 is a top plan view of the lower-most fixture of FIGS. 1–4, of part of the machine clamping head on which it is mounted and of the injection nozzle.

As shown in fragmentary view of FIG. 4A, if the nozzle tip surface 108a is spherical the inlet surface 104a can be conical. The engagement between surfaces 104a and 108a is then a continuous annular sealing line at 111 even if the body is askew. Conversely, as shown in FIG. 4B the surface 104b can be spherical and the nozzle tip surface 108b can be the rather sharp edge intersection of two planes 112 and 113.

The release of the clamping force, the removal of the assembly from the injection molding machine and the removal of the mandrels from the lined body are standard operations which need not be described here.

Figure 3A:
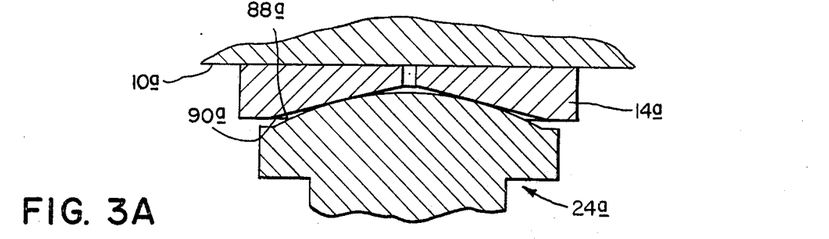
FIGURES 3A, 3B, 3C and 3D are fragmentary views of other embodiments in which one of the engaging mandrel and fixture surfaces is spherical and the other is not.
Figure 3B:
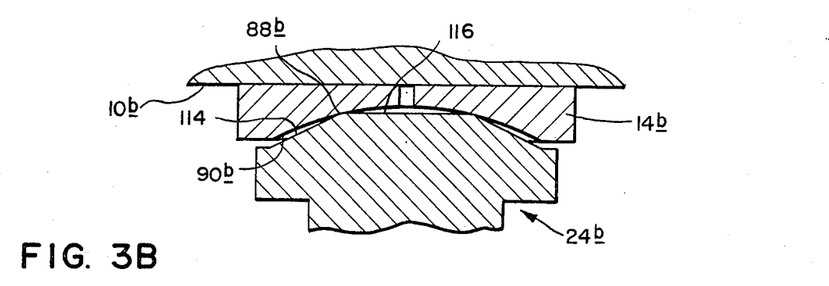
Figure 3C:
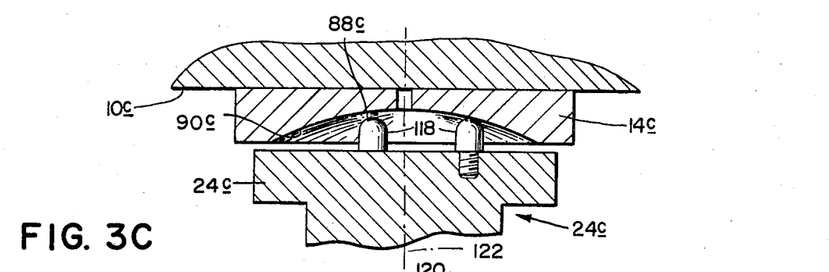
Figure 3D:
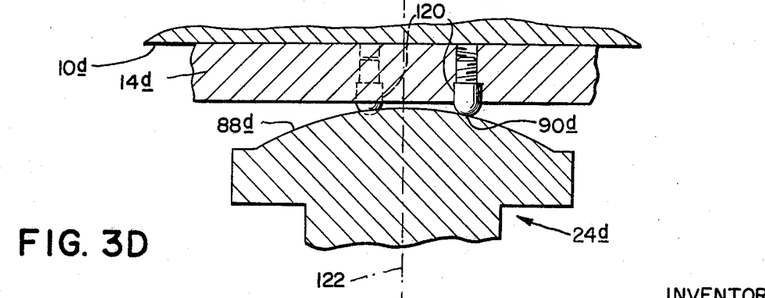

FIGURES 3A, 3B, 3C and 3D are fragmentary views which show that only one of the engaging mandrel member and fixture surfaces 88 and 90 in FIGS. 1 to 4 need be spherical if the other is shaped to provide an equivalent engagement. For example, FIG. 3A shows that the fixture surface 90a can be conical when the mandrel surface 88a is spherical, and FIG. 3B shows that, conversely, the mandrel surface can be an annular edge 88b formed by the intersection of two planes 114 and 116 when the fixture surface 90b is spherical. FIG. 3C shows that if the fixture surface 90c is spherical, the mandrel surface need be only three support points 88c (of which this cross-sectioned view shows only two) provided, in this case, by pins 118 threaded into the mandrel member 24c. FIG. 3D shows that, conversely, if the mandrel surface 88d is spherical the fixture surface need be only three support "points" 90d provided by pins 120 threaded into fixture 14d. The three "support points" in FIGS. 3C and 3D are preferably equally spaced about the axis 122 of the diaphragm opening.

In the embodiments shown in the drawings the initial mounting of the body-mandrel assembly is on the upper clamping head. As a result there is usually a lateral shifting of the assembly with respect to the direction of clamping head movement. If, on the other hand, the molding machine parts shown were arranged upside down, that is with the nozzle coming down from above and the assembly initially mounted on the fixture on the lower clamping head, there would be no such lateral shifting because this initial mounting of the assembly would cause the spherical surfaces to be in full contact with each other (under the influence of gravity) from the start. Accordingly, any movement of the assembly caused by closing the heads could be a rotation only.

Another possibility is the arrangement of the machine heads so that one moves horizontally, in which case the final shifting of the assembly which would bring the spherical surfaces into complete contact would involve both lateral and rotational components.

For the purpose of this description and the claims these lateral shifting or rotational movements above-described may be referred to independently or collectively as "swivelling" movements.

The foregoing description has to do with injection molding of plastic lining material in a diaphragm valve body.

Transfer molding can also be used. In transfer molding, the lining material is first placed in a transfer chamber or "pot." Here it is plasticized by the application of heat. When the material is completely plasticized, it is forced through a nozzle and sprue into the piece being lined by a ram having a very close fit with the walls of the pot. Sufficient pressure is applied by the ram to completely fill the lining cavity. For each piece to be lined, a weighed charge of the lining material is placed in the pot.

In an injection molding machine, a large quantity of the lining material is placed in a hopper, from which it is fed to a cylinder where it is plasticized by heat, or by a combination of heat and mechanical working by a screw mechanism. A ram (or the screw acting as a ram) then forces the plasticized material into the piece to be lined. The reciprocating ram or screw automatically measures out the amount of plastic required for each shot. While the press is open for removal of the finished piece and insertion of a piece to be lined, the machine is plasticizing the charge of lining material for the next shot. Thus, the machine will operate semi-automatically, the only required manual operations being removal of lined pieces and insertion of pieces to be lined.

Any lining material which can be transfer or injection molded can be used in the present invention. This includes not only plastics but also materials not usually known as plastics, for example, natural and synthetic rubbers.

Pieces other than valve bodies can be lined in accordance with the present invention. Examples are cast metal pipe fittings used in plastic lined piping systems.

I claim:

1. In apparatus for clamping a hollow metal body between the relatively movable heads of an injection molding machine for injecting a lining material into the body, which apparatus comprises:
  (I) a mandrel which:
    (A) extends into the body through an opening therein,
    (B) overlies a surface of the body around said opening,
  (II) means for mounting said body and mandrel between said machine heads with said body surface presented in a direction of clamping head movement
improvements comprising:
  (III) means:
    (A) actuated by the clamping movement of said heads,
    (B) for swivelling said mandrel and body with respect to said heads,
whereby the force exerted by said mandrel on said body surface is substantially uniform around said body opening.

2. In apparatus for clamping:
  (I) a hollow metal body having:
    (A) an opening,
    (B) a flange surface around said opening,
in position in:
  (II) an injection molding machine having a pair of clamping heads which are movable:
    (A) relative to each other,
    (B) in a closing direction,
to have a lining material injected into the body, which apparatus comprises:
  (III) a mandrel which:
    (A) extends into said body opening,
    (B) overlies said body flange surface,
  (IV) means for mounting said body and mandrel between said machine heads with said body flange surface presented in said direction,
improvements comprising:
  (V) means actuated by the closing of said heads for swivelling said mandrel and body with respect to said heads,
whereby the forces exerted by said mandrel on said body flange surface are substantially uniform around said body opening.

3. In apparatus for clamping a hollow metal body between the relatively movable heads of an injection molding machine for injecting a lining material into the body, which apparatus comprises:
  (I) a bearing member which:
    (A) is adjacent one of said heads,
    (B) has a surface presented toward the other of said heads
  (II) a mandrel member which:
    (A) extends into the body through an opening therein,
    (B) overlies a surface of the body around said opening,
  (III) means for initially mounting said body and mandrel between said machine heads:
    (A) with said body surface presented in a direction of clamping head movement
    (B) with said mandrel spaced from said bearing member surface,
improvements comprising:
  (IV) means:
    (A) actuated by the closing movement of said heads which:
      (1) brings said bearing member surface and mandrel into contact,
      (2) clamps said body,
    (B) for swivelling said mandrel and body with respect to said heads,
whereby the force exerted by said mandrel on said body surface is substantially uniform around said body opening.

4. In apparatus for clamping:
  (I) a hollow metal body having:
    (A) an opening which:
      (1) is in one side of said body,
      (2) lies generally in a plane,
      (3) has a center,
      (4) has an axis which: (a) passes through said opening center; (b) is substantially perpendicular to said plane,
    (B) a flange which:
      (1) is around said opening
      (2) has a clamping surface presented generally along said axis,
in injection position in:
  (II) an injection molding machine having:
    (A) a pair of clamping heads which are movable:
      (1) relative to each other
      (2) in one direction to open and receive the body
      (3) in the opposite direction to close and clamp the body,
    (B) an injection nozzle which is reciprocable:
      (1) in said directions
      (2) independently of said head movements
which apparatus comprises:
  (III) a first fixture which:
    (A) is adjacent one of said heads, (B) has a surface presented toward the other of said heads,
(IV) a mandrel member having:
 (A) a core portion extending into said body opening,
 (B) a flange portion which:
  (1) extends radially outwardly from said core portion with respect to said axis,
  (2) overlies said body opening flange,
 (C) an engagement surface which:
  (1) is opposite said core portion,
  (2) is presented toward said first fixture surface,
(V) a second fixture which:
 (A) is adjacent the other of said machine heads
 (B) has a surface presented toward said first fixture surface,
(VI) means for initially mounting said body and mandrel member between said machine heads:
 (A) with said opening axis generally parallel to said directions of clamping head movement,
 (B) with said first fixture and mandrel surfaces spaced apart,
improvements comprising at least one of said mandrel member and first fixture surfaces being a section of a sphere and the other such surface engaging said sphere section at at least three points thereon.

5. In apparatus according to claim 4 further improvements comprising said other of said mandrel member and first fixture surfaces being a section of a sphere of substantially the same size as said first-mentioned sphere.

6. In apparatus according to claim 4 further improvements comprising the sphere center lying substantially on said axis when said mandrel member and first fixture surfaces are in full engagement with each other.

7. In apparatus according to claim 4 further improvements comprising said body and mandrel member forming an assembly which has a plastic inlet located substantially on said axis.

8. In apparatus according to claim 7 further improvements comprising said inlet being surrounded by an annular surface adapted to be engaged by the tip surface on an injection molding machine nozzle and at least one of said assembly inlet and nozzle tip surfaces being a section of another sphere.

9. In apparatus according to claim 8 further improvements comprising all of said sphere centers being substantially coincidental when said mandrel member and first fixture surfaces are fully engaged and when said assembly inlet and nozzle tip surfaces are also fully engaged.

10. In apparatus according to claim 8 further improvements comprising the other of said assembly inlet and nozzle tip surface being a section of a sphere of substantially the same size as said other sphere.

11. In apparatus according to claim 4 further improvements comprising said mandrel member engagement surface being a section of a cone.

12. In apparatus according to claim 4 further improvements comprising said first fixture surface being an annular edge formed by the intersection of two surfaces.

13. In apparatus according to claim 3 further improvements comprising said first fixture surface having at least three separate support points spaced from said axis and each other.

14. In apparatus according to claim 4 further improvements comprising said mandrel member engagement surface having at least three separate support points spaced from said axis and each other.

15. In apparatus according to claim 8 further improvements comprising said annular plastic inlet surface being a section of a cone.

16. In apparatus according to claim 8 further improvements comprising said nozzle tip surface being an endless annular edge formed by the intersection of two surfaces.

17. In apparatus according to claim 4 further improvements comprising said mounting means permitting said mandrel member to move laterally with respect to said first fixture at right angles to said axis when said clamping heads are open.

18. In apparatus for clamping:
(I) a hollow metal body having:
 (A) an opening,
 (B) a seal surface around said opening,
 (C) an injection inlet,
 (D) a bearing surface around said inlet
in position in:
(II) an injection molding machine having:
 (A) a pair of clamping heads:
  (1) which are movable relative to each other,
  (2) which are movable in a closing direction,
  (3) one of which has a bearing surface,
 (B) an injection nozzle which is reciprocable:
  (1) in said direction,
  (2) independently of said clamping head movement,
  (3) has a bearing surface
to have a lining material injected into the body, which apparatus comprises:
(III) a mandrel which:
 (A) extends into said body opening,
 (B) overlies said body first surface,
 (C) has a bearing surface
(IV) means for mounting said body and mandrel between said machine heads:
 (A) with said clamping head and mandrel member bearing surfaces adjacent each other,
 (B) with said injection nozzle and body bearing surfaces presented toward each other,
improvements comprising:
(V) means which:
 (A) are actuated by the closing of said clamping heads,
 (B) for pivoting said body and mandrel on both said sets of bearing surfaces simultaneously with respect to said clamping heads and injection nozzle.

References Cited

UNITED STATES PATENTS

| 1,527,361 | 2/1925 | Jones et al. | 249—88 |
| 1,783,438 | 12/1930 | Landers | 249—87 |
| 2,473,483 | 6/1949 | Tobener et al. | 249—87 |
| 2,814,831 | 12/1957 | McKee | 18—30 |
| 3,093,864 | 6/1963 | Waldron et al. | 249—87 |

FOREIGN PATENTS 1,062,169  3/1967  Great Britain.

J. SPENCER OVERHOLSER, Primary Examiner

M. O. SUTTON, Assistant Examiner

U.S. Cl. X.R.

249—88